(12) United States Patent
Copeland

(10) Patent No.: US 10,436,359 B2
(45) Date of Patent: Oct. 8, 2019

(54) RESTRAINED PLASTIC PIPE JOINT AND METHOD OF MAKING SAME

(71) Applicant: McWane, Inc., Birmingham, AL (US)

(72) Inventor: Daniel A. Copeland, Bessemer, AL (US)

(73) Assignee: McWane, Inc., Birmingham, AL (US)

( * ) Notice: Subject to any disclaimer, the term of this patent is extended or adjusted under 35 U.S.C. 154(b) by 358 days.

(21) Appl. No.: 15/263,543

(22) Filed: Sep. 13, 2016

(65) Prior Publication Data

US 2018/0031157 A1 Feb. 1, 2018

Related U.S. Application Data

(63) Continuation of application No. 15/151,932, filed on May 11, 2016.

(51) Int. Cl.

| | | |
|---|---|---|
| *F16L 21/03* | (2006.01) | |
| *B21D 39/04* | (2006.01) | |
| *F16L 37/08* | (2006.01) | |
| *F16L 47/08* | (2006.01) | |
| *F16L 21/02* | (2006.01) | |
| *F16L 17/035* | (2006.01) | |
| *F16L 37/084* | (2006.01) | |

(52) U.S. Cl.
CPC .............. *F16L 21/03* (2013.01); *B21D 39/04* (2013.01); *B21D 39/046* (2013.01); *F16L 17/035* (2013.01); *F16L 21/022* (2013.01); *F16L 37/08* (2013.01); *F16L 37/0845* (2013.01); *F16L 47/08* (2013.01); *Y10T 29/49872* (2015.01); *Y10T 29/49954* (2015.01)

(58) Field of Classification Search
CPC ....... F16L 21/03; F16L 17/035; F16L 21/022; F16L 37/08; F16L 37/0845; F16L 47/08; Y10T 29/49872; Y10T 29/49954; B21D 39/04; B21D 39/046
See application file for complete search history.

(56) References Cited

U.S. PATENT DOCUMENTS

| | | |
|---|---|---|
| 5,295,697 A | 3/1994 | Weber et al. |
| 5,464,228 A | 11/1995 | Weber et al. |
| 6,688,652 B2 | 2/2004 | Holmes, IV et al. |

(Continued)

*Primary Examiner* — Jermie E Cozart
(74) *Attorney, Agent, or Firm* — C. Brandon Browning; Maynard, Cooper & Gale, PC

(57) ABSTRACT

A gasket for preventing the separation of a pipe joint formed between plastic pipes such as pipes manufactured from PVC. The invention provides a restrained pipe joint including a first pipe including a bell with a spigot entryway and a substantially V-shaped annular groove. The annular groove includes a front radial wall and a rear radial wall and a gasket seated in the annular groove. The gasket includes an inner radial face, an opening defined by the inner radial face and an outer radial face with a front radial section located adjacent to the front radial wall of the annular groove and a rear radial section located adjacent to the rear radial wall of the annular groove. A plurality of restraining segments is at least partially embedded in the gasket, each restraining segment including a toothed inner face and a smooth, sliding front radial face arranged to slide against the front radial wall of the annular groove and facilitate wedging of the segment between the plastic pipes.

12 Claims, 6 Drawing Sheets

(56) References Cited

U.S. PATENT DOCUMENTS

| | | |
|---|---|---|
| 7,284,310 B2 | 10/2007 | Jones et al. |
| 7,401,791 B2 | 7/2008 | Andrick et al. |
| 7,784,798 B2 | 8/2010 | Walworth et al. |
| 7,815,225 B2 | 10/2010 | Jones et al. |
| 7,845,686 B2 | 12/2010 | Steinbruck |
| 8,235,427 B2 | 8/2012 | Jones et al. |
| 8,444,186 B2 | 5/2013 | Jones et al. |
| 8,490,273 B1 | 7/2013 | Copeland et al. |
| 8,511,690 B2 | 8/2013 | Holmes, IV et al. |
| 8,511,691 B2 | 8/2013 | Holmes, IV et al. |
| 8,533,926 B2 | 9/2013 | Holmes, IV et al. |
| 8,544,851 B2 | 10/2013 | Holmes, IV et al. |
| 8,870,188 B2 | 10/2014 | Holmes, IV et al. |
| 9,057,467 B2 | 6/2015 | Copeland et al. |
| 9,400,073 B2 | 7/2016 | Lopez-Chaves |
| 9,593,787 B2 † | 3/2017 | Monteil |
| 2007/0063516 A1 * | 3/2007 | Jones ................ F16L 37/0845 285/374 |
| 2008/0018104 A1 | 1/2008 | Walworth et al. |
| 2010/0078937 A1 | 4/2010 | Jones et al. |
| 2010/0225111 A1 | 9/2010 | Owen |
| 2012/0025471 A1 | 2/2012 | Andrick et al. |
| 2013/0043656 A1 | 2/2013 | Copeland et al. |
| 2014/0339773 A1 | 11/2014 | Holmes, IV et al. |
| 2014/0374994 A1 | 12/2014 | Monteil |
| 2015/0204468 A1 | 7/2015 | Jones |
| 2016/0245436 A1 | 8/2016 | Monteil |

\* cited by examiner
† cited by third party

RESTRAINED PLASTIC PIPE JOINT AND METHOD OF MAKING SAME

RELATED APPLICATIONS

This application is a continuation of and claims priority to U.S. patent application Ser. No. 15/151,932, filed on May 11, 2016, and titled, "Restrained Plastic Pipe Joint and Method of Making Same," the entire contents of which are incorporated herein.

FIELD OF THE INVENTION

The present invention is directed to a restrained plastic pipe joint and method of making same and, more particularly, to a method of converting of plastic pipe bell intended for forming an unrestrained pipe joint into a pipe bell configured for forming a restrained pipe joint.

BACKGROUND OF THE INVENTION

Leakage between two adjoining pieces of plastic pipe after the spigot end of one pipe is inserted into the bell end of another pipe is traditionally prevented by means of a rubber sealing gasket that is seated in the pipe bell. Today, more than 90% of polyvinylchloride (PVC) pipes in the North America, whether intended for pressurized or non-pressurized applications, include "locked-in" gaskets, which are commonly referred to Rieber gaskets. A Rieber gasket consists of a continuous steel band either externally or internally bonded to an elastomer annular body. The Rieber gasket is incorporated into the pipe during the belling process and locked into place within an annular groove of the bell. The steel band functions to prevent the gasket from becoming dislodged from the bell.

Rieber gaskets offer very little resistance to axial separation of plastic pipe joints upon fluid pressurization of the joints. To overcome this shortcoming of Rieber joints, restraint harnesses are often used for preventing the withdrawal of plastic spigots from plastic bells. Restraint harnesses consist of two split serrated restraint rings, one secured about the spigot end of one pipe and the other secured about the bell end of another pipe. The restraint rings are fastened into a harness by an array of thrust rods, which are tightened against the ring thereby pressing the pipes together. While restraint harnesses prevent axial separation of plastic pipe joints, the cost of the harnesses and time required to install the harness limit their use.

SUMMARY OF THE INVENTION

The present invention is directed to a method of forming a restrained pipe joint between plastic pipes where the bell portion of the joint is originally formed with the intention of forming an unrestrained joint. The invention is based upon the discovery that locked-in gaskets, such as Rieber gaskets, formed within bell ends of plastic pipes during belling of the pipes can be replaced with gaskets containing metal locking segments and that such gaskets can form seals between joined plastic pipes and prevent separation of the pipes upon pressurization without the metal segments destructively impinging upon the pipes.

According to one aspect of the invention there is provided a method of forming a restrained plastic pipe joint. The method includes providing a first plastic pipe and forming in the first plastic pipe a bell end having an annular groove with a substantially V-shaped cross-section, a front annular wall and a rear annular wall. An elastomeric sealing ring, such as a Rieber gasket, is locked within the annular groove during belling of the first plastic pipe, the elastomeric sealing ring containing a metal ring. The first plastic pipe arranged in this manner is not configured to form a restrained pipe joint, absent the use of a restraint harness or other similar device.

To convert the first pipe for use in an unrestrained pipe joint to use in a restrained pipe joint, the locked-in sealing ring is removed from the annular groove of the bell without affecting the integrity of the bell end. This can be done by inserting a pry bar between the sealing ring and the front annular wall of the bell and pivoting the pry bar against the pipe wall thereby causing the metal ring to deform and become dislodged from the annular groove. Thereafter, a gasket according to the present invention is seated within the annular groove. This can occur at a worksite where the restrained pipe joint is to be formed and installed below ground and/or immediately prior to installation of the restrained pipe joint. The gasket includes an inner annular face defining an opening and a plurality of rigid segments arranged circumferentially within the gasket, at least one of the rigid segments including a tooth extending inwardly towards the opening, an inner surface from which the tooth extends towards the opening and an outer surface that intersects with the inner surface to form a nose portion.

To form the restrained pipe joint, a spigot end of a second pipe is inserted into an entryway of the bell end of the first pipe and through the opening of the gasket thereby forming a pipe joint. Forward motion of the spigot into the bell discontinues when a tip of the spigot contacts a proximal end of the bell. When the pipe joint is pressurized, the resulting hydrostatic pressure within the pipes causes the pipes to partially separate. As the spigot end is caused to withdraw from the bell end by pressurization of the pipe joint, the segment tooth is caused to dig into the spigot end and the at least one rigid segment to move towards the entryway. When this occurs, the outer surface of the segment bears initially against a first length of the annular front wall having a first average wall thickness, and thereafter, the segment slides against the front annular wall, directly or indirectly through the rubber portion of the gasket, towards the entryway as the spigot end is further withdrawn from the bell end. As this occurs, the segment begins to wedge between the front annular wall and the spigot end thereby causing the tooth to dig further into the spigot end. Sliding of the segment against the front annular wall is halted when the outer surface of the segment contacts a second length of the annular front wall having a second average wall thickness that is greater than the first average wall thickness by virtue of the belling process and the greater diameter of the first length relative to the second length. Movement of the spigot end towards the entryway is restrained by bearing the at least one rigid segment against the bell end and the spigot end and, embedding the tooth entirely within the spigot end, and wedging the segment between the spigot and the bell ends.

According to another aspect of the invention the at least one segment is configured for preventing both over-translation of the segment distally towards the entryway and the segment from exerting outwardly extending radial forces caused by pressurization of the pipe joint directly onto any portion of bell end other than the second length of the annular front wall of the annular groove, provided the pipe joint is exposed to the normal operating pressure. This is accomplished in part by ensuring that a first angle formed by the intersection of a plane defined by the inner surface of the segment and a plane defined by the outer surface of the segment is the same or substantially the same as a second angle formed by an intersection of plane defined by an outer surface of the spigot and a plane defined by the inner surface of the front annular wall. This ensures the desired amount of sliding of the segment against the front wall of the annular groove and the desired final location of the segment relative to the front annular wall, i.e., a length of the front wall having the greatest thickness.

According to yet another aspect of the invention there is provided a restrained pipe joint including a plastic first pipe including a bell with a spigot entryway and a substantially V-shaped annular groove. The annular groove includes a front radial wall and a rear radial wall and a gasket seated in the annular groove. The gasket includes an inner radial face, an opening defined by the inner radial face and an outer radial face with a front radial section located adjacent to the front radial wall of the annular groove and a rear radial section located adjacent to the rear radial wall of the annular groove. The gasket also includes a sealing portion having an indentation formed between a pair of arms extending away from the spigot entryway of the first pipe.

A plurality of restraining segments is at least partially embedded in the gasket. Each restraining segment includes an inner wall having a tooth extending towards the opening in the gasket, an outer wall and a nose portion formed by an intersection of the inner wall and the outer wall. The inner wall and the outer wall of the restraining segment define respective planes that intersect one another at an angle of about 40° to about 50° to form nose, the inner wall, the nose and the outer wall forming an essentially V-shaped cross-section, which may be acutely pointed or curved. The nose extends towards the spigot entryway and into a space defined between the spigot and the front radial wall of the annular groove, a tip of the nose being located forward of the tooth. The tooth is arranged to impinge upon the spigot upon pressurization of the pipe joint.

DETAILED DESCRIPTION OF THE INVENTION

Figure 1:
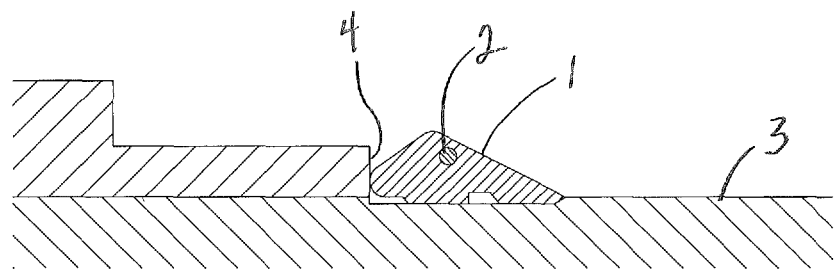
FIG. 1 is a partial sectional view of a mandrel having a Rieber gasket disposed thereabout in accordance with the prior art.
Figure 2:
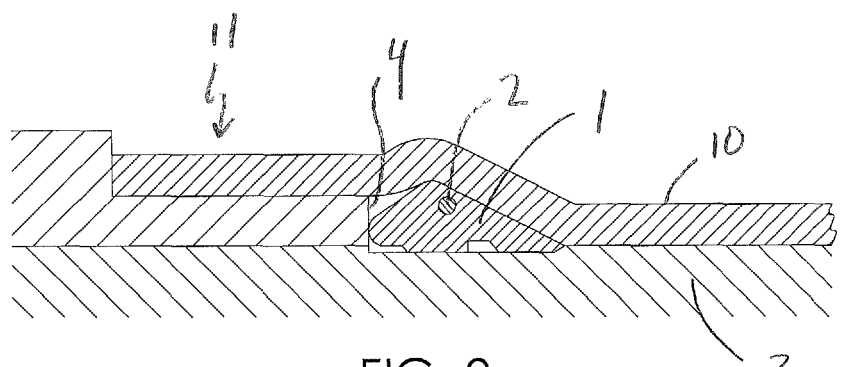
FIG. 2 is a partial sectional view of the mandrel and Rieber gasket of FIG. 1 being used to form a bell within a plastic pipe in accordance with the prior art.
Figure 3:
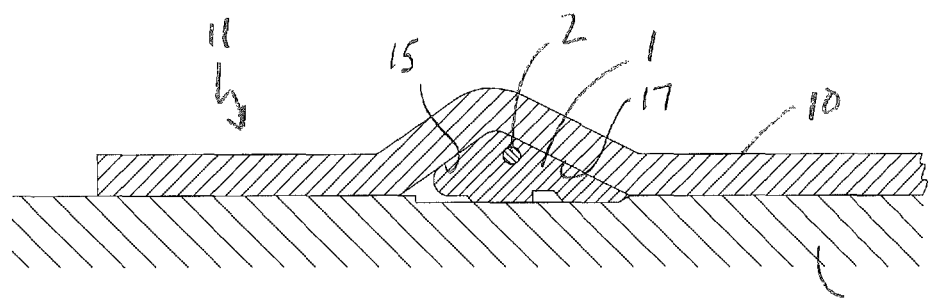
FIG. 3 is a partial sectional view of the plastic pipe of FIG. 2 containing the Rieber and displaying of completed bell in accordance with the prior art.
Figure 4:
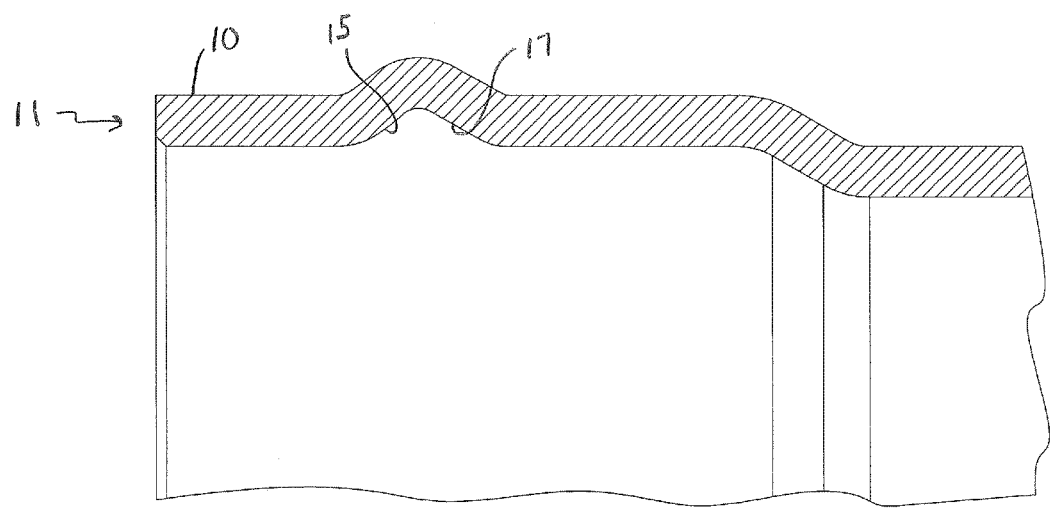
FIG. 4 is a sectional view of the bell end of the plastic pipe of FIG. 2 with the Rieber gasket removed in accordance with the present invention.
Figure 5:
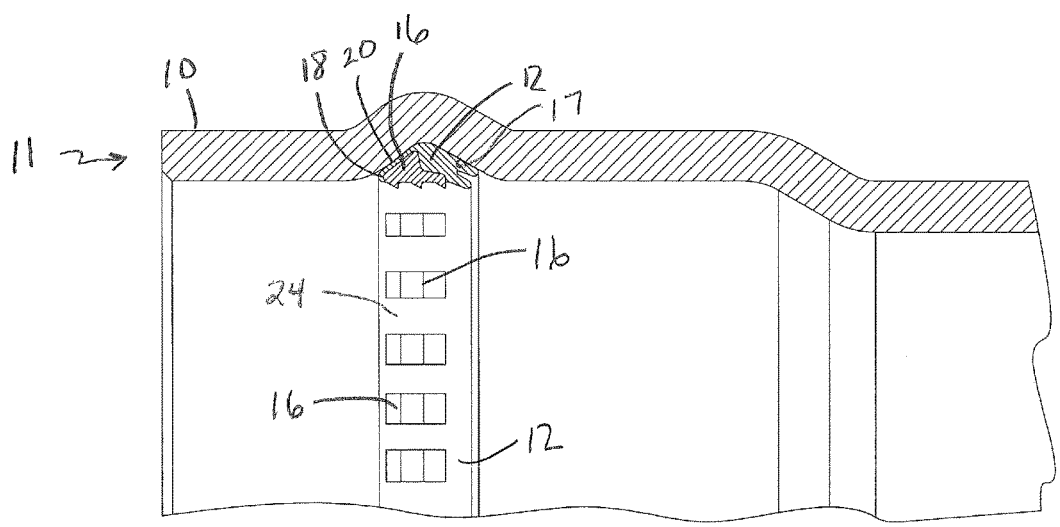
FIG. 5 is a sectional view of the bell end of the plastic pipe of FIG. 2 displaying a gasket seated within the bell end in accordance with the present invention.
Figure 6:
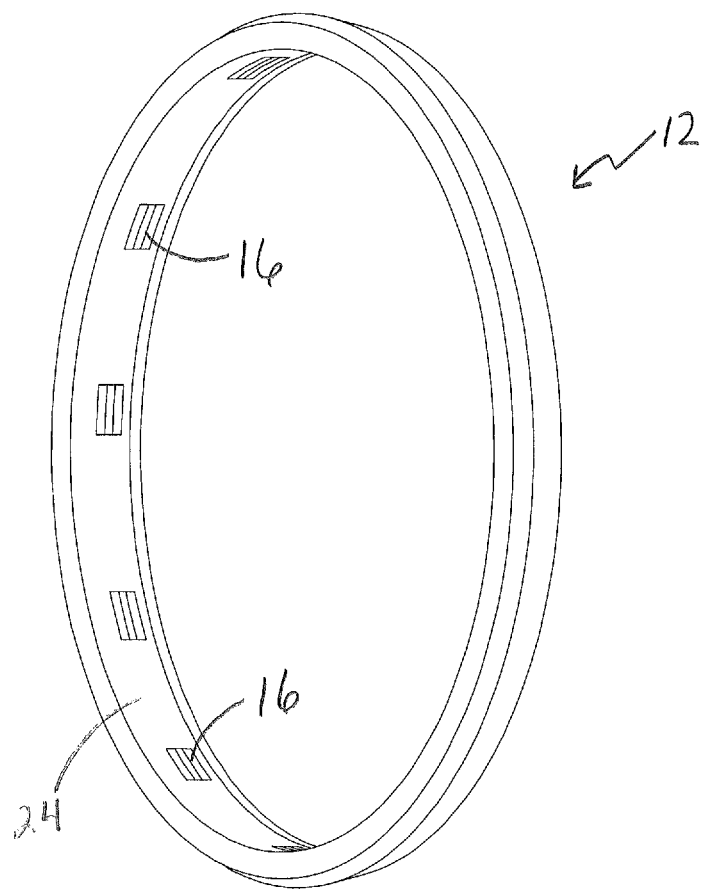
FIG. 6 is a perspective view of the gasket of FIG. 5 showing the placement of restraining segments around its periphery.
Figure 7:
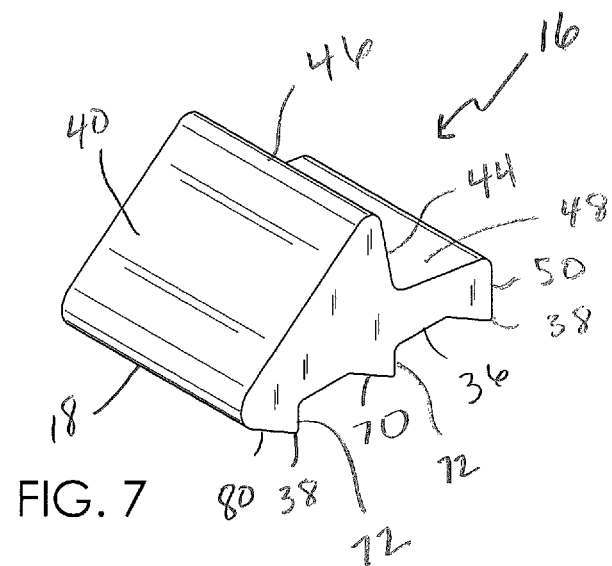
FIG. 7 is a front perspective view of one of the restraining segments of FIG. 5.
Figure 8:
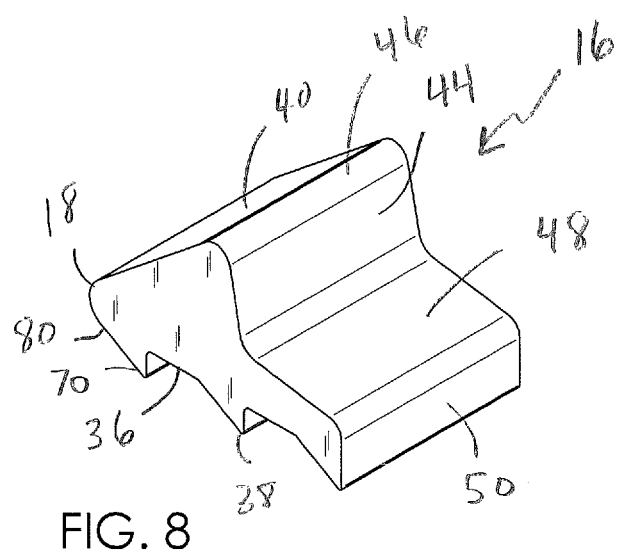
FIG. 8 is a rear perceptive view of the restraining segment of FIG. 5.
Figure 9:
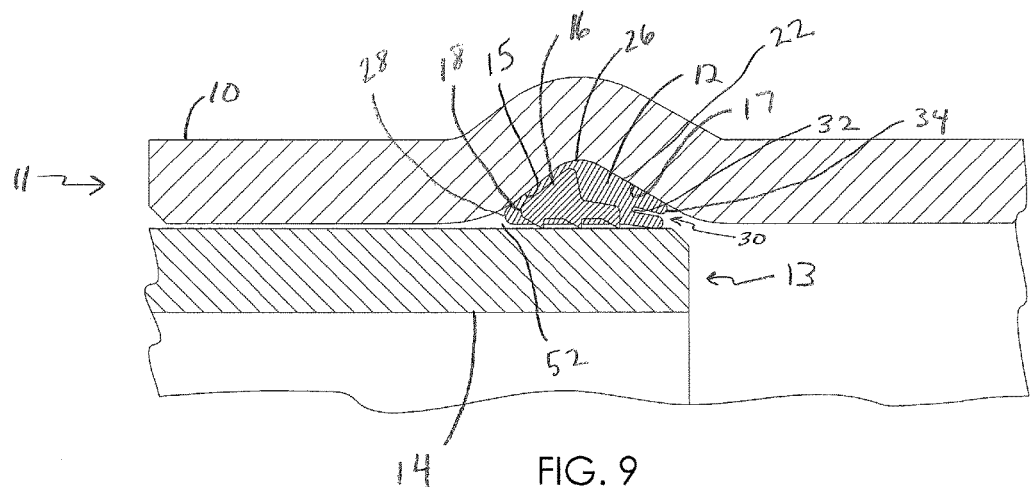
FIG. 9 is a partial sectional view of the bell end and the gasket of FIG. 5 illustrating insertion of a spigot end of another plastic pipe through the gasket.
Figure 10:
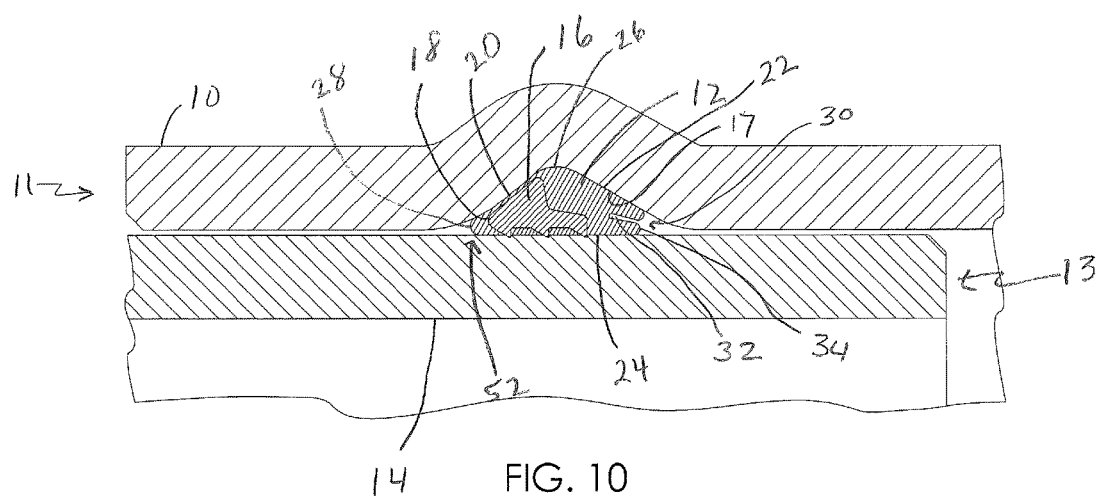
FIG. 10 is a partial sectional view of the bell end, the gasket and the spigot end of FIG. 5 illustrating the arrangement of the restraining segment during pressurization of the interconnected pipes.
Figure 11:
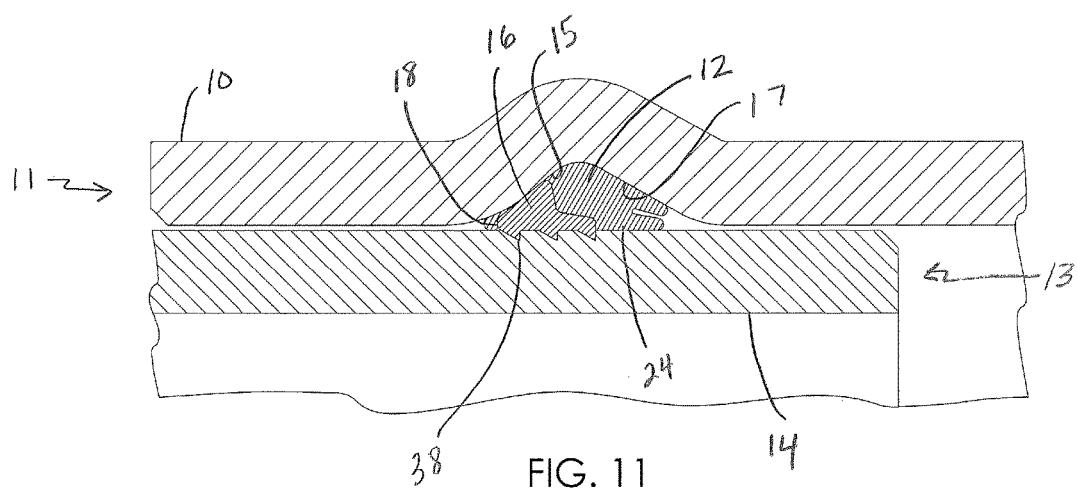
FIG. 11 is a partial sectional view of the bell end, the gasket and the spigot end of FIG. 5 illustrating the wedged arrangement of the restraining segment following pressurization of the interconnected pipes.

The present invention is directed to method of converting a prior art plastic pipe, which is intended for use in an unrestrained plastic pipe joint, into a pipe configured for use in a restrained plastic pipe joint. The present invention is further directed to a gasket for use in the restrained pipe joint and a method of making the restrained pipe joint. FIGS. 1 through 3 of the application depict the belling of the plastic pipe in accordance with the prior art, and FIGS. 4 and 5 depict the conversion of the plastic pipe into a pipe configured for forming a restrained pipe joint. FIGS. 6 through 8 depict the gasket and gasket locking segments, and FIGS. 9 through 11 depict the method of forming the restrained plastic pipe joint. Throughout the accompanying drawings, identical or similar parts are represented by the same reference numerals and characters.

As used herein, "alloy" means pure metals and metals including incidental impurities and/or purposeful additions of metals and/or non-metals. For example, alloy may mean aluminum. Other examples of alloys include brass, bronze, copper, duralumin, Inconel, nickel, steel, stainless steel, titanium, other alloys known to those skilled in the art, and combinations of the same.

As used herein, "plastic" means a thermoplastic, a thermoset plastic, polyvinyl chloride (PVC) or other extruded high molecular mass, organic polymer, and other plastics known in the art.

As used herein, "Rieber gasket" means a gasket containing a ring of alloy, such as an alloy wire, and a flexible material, such as rubber, the ring of alloy being completely or partially embedded within the flexible material. The ring may be a continuous ring or include a break.

As used herein, "rubber" means any natural, cured, reclaimed, vulcanized and synthetic elastomers including, but not limited to, acrylic rubber, acrylonitrile butadiene rubber (nitrile or NBR), butyl rubber (IIR), ethylene propylene diene monomer (EPDM), fluoroelastomer rubber, hydrogenated nitrile rubber, styrene-butadiene rubber (SBR), silicone, and like flexible materials known in the art having elastic memory.

Generally, the restrained pipe joint of the present invention includes a bell end 10 of a first plastic pipe 11, a rubber gasket 12 seated within bell end 10 and a spigot end 14 of a second plastic pipe 13 inserted through gasket 12, gasket 12 forming a seal between pipes 11 and 13. Alloy locking segments 16 are embedded within and circumferentially arranged around gasket 12. Locking segments 16 are arranged to impinge upon, engage or otherwise dig into pipe 13 upon pressurization of the pipe joint thereby restraining axial movement of spigot end 14 out of bell end 10. To ensure the desired engagement and final placement of locking segments 16 between pipes 11 and 13 and further resist axial separation of the pipes, locking segments 16 each include an inner and outer surface that converge to form a nose portion 18 that, upon pipe pressurization of the pipes, functions as a wedge between pipes 11 and 13. The foregoing is accomplished without the use of a joint gasket gland, restrain harness or a Rieber gasket.

More particularly, the extrusion process used to form plastic pipes is well known by those skilled in the art.

Generally described, the extrusion process begins by introducing plastic resin into an extruder wherein the material is heated, softened and forced through a die to form the pipe shape. The extruded pipe is then partially cooled in a water bath and then passes through a pulling device that pulls the extruded pipe from the die and through the water bath. Thereafter, a bell is formed in one end of the pipe.

Referring to FIGS. 1 through 3, the prior art belling process includes placement of a conventional elastomeric Rieber gasket 1 having a steel reinforcing ring 2 on a generally cylindrical mandrel 3. Rieber gasket 1 is a ring shaped, having a front portion which, as shown in FIG. 1, abuts a collar 4. Bell end 10 of first plastic pipe 11 is heated and pushed over mandrel 3, Rieber gasket 1 and collar 4. Bell 10 is expanded due to the thermoplastic nature of the pipe. Thereafter, mandrel 3 and first plastic pipe 11 move away from collar 4, and bell end 10 retracts around mandrel 3 and Rieber gasket 1 due to the elastic forces of the thermoplastic material. In the final step of the prior art process, bell end 10 is cooled, and as the cooling takes place, bell end 10 shrinks around Rieber gasket 1, thus compressing the rubber body of the gasket between steel reinforcing ring 2 and a front radial wall 15 and a rear radial wall 17 of a retainer groove formed by displacement of the pipe about Rieber gasket 1, which locks the rubber body between ring 2 and the retainer groove wall.

Using this known apparatus and method, wall thickness of bell end 10 is varied because of the radial enlargement about mandrel 3 and Rieber gasket 1. Thus, it is well understood that, by definition, forming the retainer groove into the interior surface of the belled pipe end progressively reduces wall thickness, thereby reducing pipe wall strength, such that greater the inner diameter of the bell end and retainer groove, the thinner and weaker the pipe wall strength.

Referring to FIGS. 4 through 6, when it is desired to convert first plastic pipe 11 from use in an unrestrained pipe joint to use in a restrained pipe joint, Rieber gasket 1 is removed from the retainer groove of bell 10, and gasket 12 is seated within the annular groove. Depending on the size of the Rieber gasket, it may be removed by prying it from the retainer groove with a screw driver or a conventional pry bar. Gasket 12 is composed of an annular rubber body having a generally triangular cross-section defined by a front outer face 20, a rear outer face 22 and an inner face 24. Gasket 12 is positioned within the retainer groove with front outer face 20 being arranged adjacent to and, in sealing engagement with, front radial wall 15 and rear outer face 22 being arranged adjacent to and, in sealing engagement with, rear radial wall 17. As depicted in FIGS. 5, 9 and 10, the intersections of faces 20, 22 and 24 form three corners including a first corner 26 formed by the intersection of front outer face 20 and rear outer face 22, a second corner 28 formed by the intersection of front outer face 20 and inner face 24 and a third corner portion 30 formed by the intersection of rear outer face 22 and inner face 24. For reasons described hereafter, third corner portion 30 includes an indentation 32 that divides rear third portion 30 into a pair of opposing, slightly flared arms 34 which extend proximally and form a substantially V-shaped space or gap therebetween.

Inserted into gasket 12 are locking segments 16. As depicted in FIG. 6, segments 16 are spaced apart equally in a circumferential direction around the periphery of gasket 12 and firmly vulcanized into radial grooves found within gasket 12. The number of locking segments 16 inserted into gasket 12 varies depending upon the anticipated fluid pressure at the pipe joint and the size of the pipes involved.

Referring to FIGS. 7 and 8, each segment 16 includes a substantially flat, inner surface 36 having three rows of acutely pointed, planar-arranged teeth 38 extending radially inward therefrom. Inner surface 36, which is preferably embedded within the rubber body of gasket 12, extends adjacent to and along inner face 24 of gasket 12 with teeth 38 protruding slightly through inner surface 24. Each segment 16 further includes a substantially flat, smooth front outer surface 40 that intersects inner surface 36 at nose portion 18, or more specifically, a tapered distal inner surface 80 of the distal-most tooth 38. Front outer surface 40 extends adjacent to and along front outer face 20 of gasket 12 with nose portion 18 being positioned adjacent to second corner 28. In addition to inner surface 36 and front outer surface 40, each segment 16 includes a substantially L-shaped rear outer surface defined by a vertical surface 44, which intersects front outer surface 40 to form a first edge 46 positioned adjacent to first corner 26 of gasket 12, and a horizontal surface 48, which extends proximally from vertical surface 44 and parallel to inner surface 36. Horizontal surface 48 intersects a distal-most surface 50 of segment 16, which forms a portion of the distal-most row of teeth 38. L-shaped surface is configured to maximize the mass and thickness of the proximal-most half of the rubber body of gasket 12 for improving the sealing performance of gasket 12.

Referring to FIG. 9, the restrained pipe joint of the present invention is assembled by inserting spigot end 14 of second plastic pipe 13 through an opening defined by inner surface 24 of gasket 12. A throat of bell end 10 guides spigot end 14 into bell end 10 until a beveled end of spigot end 14 contacts a distal-most row of teeth 38. As spigot end 14 continues to slide through gasket 12, spigot end 14 presses teeth 38 radially outwardly thereby causing segments 16 to move radially outwardly thereby compressing the rubber body of gasket 12 between spigot end 14, on the one hand, and front radial wall 15 and a rear radial wall 17 of the retainer groove, on the other hand. This functions to prevent gasket 12 from dislodging from the retainer groove during further insertion of spigot end 14 into bell end 10, as well as to form a seal between pipes 11 and 13. Since teeth include a tapered distal-edge 70, spigot end 14 slides across teeth 38 without the teeth impinging upon second plastic pipe 13, despite the compression of the rubber body of gasket 12. As spigot end 14 moves proximally, it contacts the innermost arm of arms 34 and causes the arm to pivot radially outward thereby decreasing space 32 defined between arms 34. By including space 32 in third corner portion 30, the innermost arm is more easily pivoted out of the way of pipe 13 as it moves proximally than if the space were absent. Thus, space 32 functions to lessen the force required to insert spigot end 14 into bell end 10.

Referring to FIG. 10, upon pressurization of the pipe joint, spigot end 14 of second plastic pipe 13 moves distally as the axial forces created by fluid pressurization force pipes 11 and 13 apart. This causes teeth 38 of each segment 16 to engage with spigot end 14 by friction or by penetrating into spigot end 14 a short distance. Teeth 38 impinge upon spigot end 14, as pipe 13 moves distally, since a proximal edge 72 of teeth 38 contacts pipe 13 at about a 90° angle. As pressure within the pipe joint is increased to normal operating pressures, segments 16 translate distally with pipe 13 towards front radial wall 15. When this occurs, front outer surface 40 of segment 16 initially bears against, either directly or through the rubber portion of gasket 12, a first length of front radial 15 wall having a first average wall thickness and defining a first average inner pipe diameter and thereafter slides against front radial wall 15 towards the entryway as spigot end 14 and thereby shifts nose portion 18 into an annular space 52 as spigot end 14 is partially withdrawn from bell end 10. This occurs without a distal-most tip of nose 18 impinging upon or contacting either front radial wall 15 or spigot end 14.

Referring to FIG. 11, sliding of front outer surface 40 of segment 16 against front radial wall 15 is halted when the front outer surface 40 of segment 16 comes into contact with a desired second length of front radial wall 15 having a second average wall thickness and defining a second average inner pipe diameter, the second average wall thickness being greater than the first average wall thickness and the second average pipe inner diameter being less than the first average pipe inner diameter by virtue of the belling process. In this manner, segments 16 become wedged between bell end 10 and spigot end 14 and the axial forces generated by the pressurization of the pipes are transmitted axially between rows of teeth 38 and front outer surface 40 of segment 16 and radially through front surface 40 and inner surface 36 of segment 16 to and between the pipes as segments 16 are urged distally into space 52. This causes teeth 38 to impinge further upon or into spigot end 14.

So that the desired amount of sliding and wedging of segments 16 occurs, nose portion 18 of each segment, and more specifically the arrangement of front outer surface 40 relative to inner surface 36 of segment 16, is configured for preventing the segments from exerting outwardly extending radial forces caused by pressurization of the pipe joint directly onto any portion of bell end 10 other than front radial wall 15 of the annular retainer groove, provided the pipe joint is exposed to the normal operating pressure. This is accomplished in part by providing front outer 40 of segment 16 that bears and slides against the radial front wall with a substantially smooth surface. It is also accomplished by ensuring that a first angle formed by the intersection of a plane defined by inner surface 36 of segment 16 and a plane defined by outer surface 40 is the same or substantially the same as a second angle formed by an intersection of plane defined by an outer surface of spigot end 14 and a plane defined by the inner surface front radial wall 15 when the spigot end is seated within bell end.

If the first angle is greater than the second angle, sliding of segments 16 towards the entryway and subsequent wedging of the segment between the bell end and the spigot end will not occur to a sufficient degree since segments 16 would bear only against the first length front radial wall 15 having the first average wall thickness, rather than bearing against the more distally-located second length of front radial wall 15 having the thicker second average wall thickness. As such, the radial forces caused by pressurization of the pipe joint would be brought to bear against the retainer groove by segments 16 at a thinner and therefore weaker portion of bell end 10 than if segments were allowed to slide a short distance towards the entryway of the bell end.

If the first angle, which is defined by intersecting planes defined by nose portion 18, is too small relative to the second angle, which is defined by intersecting planes defined by spigot end 14 and front radial wall 15, segments 16 can over translate such that segments 16 extend beyond space 52 and come to rest between bell end 10 and spigot end 14 at locations that are distal to space 52 and the retainer groove. If this occurs, segments 16 may fail to restrain separation of the joint, and the may joint fail.

Pressurization of the pipe joint and translation of segments 16 and gasket 12 distally cause the proximal sealing portion of the rubber body of gasket 12, which is formed in part by third corner portion 30, to move from a section of the annular retainer groove having a smaller volume to a larger volume. This occurs because the distance between rear radial wall 17 of the annular groove and spigot end 14 increases gradually moving distally. Despite the distal movement of third corner portion 30 of gasket 12 from a smaller volume to a larger volume section of the annular retainer groove, which causes some decompression of the third corner portion, the sealing engagement between pipes 11 and 13 along the third corner portion is maintained since arms 34, being biases outwardly, press against rear radial wall 17 and spigot end 13 by virtue of the flared configuration of the arms.

As will be apparent to one skilled in the art, various modifications can be made within the scope of the aforesaid description. Such modifications being within the ability of one skilled in the art form a part of the present invention and are embraced by the claims below.

The invention claimed is:

1. A method of forming a plastic pipe joint comprising:
   providing a first plastic pipe having a bell end with an annular groove and an elastomeric sealing ring seated within the annular groove, the elastomeric sealing ring including a metal reinforcing ring,
   removing the elastomeric sealing ring from the annular groove,
   seating a gasket within the annular groove, the gasket including an inner annular face defining an opening and a plurality of rigid segments arranged circumferentially within the gasket, at least one of the rigid segments including a tooth extending inwardly towards the opening,
   inserting a spigot end of a second pipe into an entryway of the bell end of the first pipe and through the opening of the gasket thereby forming a pipe joint,
   partially withdrawing the spigot end from the bell end thereby causing the tooth to impinge against or dig into the spigot end and the at least one rigid segment to move towards the entryway, and
   restraining movement of the spigot end towards the entryway by bearing the at least one rigid segment against the bell end and the spigot end,
   wherein, when the annular groove includes a substantially V-shaped cross-section, a front annular wall and a rear annular wall and the at least one rigid segment includes an inner surface from which the tooth extends towards the opening and an outer surface that intersects with the inner surface to form a nose portion, bearing the outer surface against a first length of the annular front wall having a first average wall thickness, and thereafter sliding the at least one rigid segment towards the entryway as the spigot end is partially withdrawn from the bell end and halting sliding of the at least one rigid segment when the outer surface of the at least one rigid segment bears against a second length of the annular front wall having a second average wall thickness that is greater than the first average wall thickness.

2. The method of claim 1 wherein the elastomeric sealing ring is a locked-in gasket.

3. The method of claim 1 wherein the at least one rigid segment is configured for halting sliding of the at least one rigid segment when the outer surface of the at least one rigid segment bears against the second length of the annular front wall.

4. The method of claim 1 wherein, when the annular groove includes the substantially V-shaped cross-section, the front annular wall and the rear annular wall and the at least one rigid segment includes the inner surface from which the tooth extends towards the opening and the outer surface that intersects with the inner surface to form the nose portion, the at least one rigid segment includes a first angle formed by an intersection of a plane defined by the inner surface of the at least one rigid segment and a plane defined by the outer surface of the at least one rigid segment that is substantially equal to a second angle formed by an intersection of plane defined by an outer surface of the spigot and a plane defined by an inner surface of the front annular wall.

5. The method of claim 1 comprising seating the elastomeric sealing ring within the annular groove during belling of the first plastic pipe.

6. The method of claim 1 comprising forming the annular groove by extruding the first plastic pipe over a mandrel having the elastomeric sealing ring disposed thereabout.

7. A plastic pipe joint manufactured according to the method of claim 1.

8. A method of forming a plastic pipe joint comprising:
locking an elastomeric sealing ring within a first plastic pipe during belling of the first plastic pipe, the elastomeric sealing ring containing a metal reinforcing ring,
removing the elastomeric sealing ring from the first plastic pipe thereby exposing an annular groove in a bell end of the first plastic pipe, the annular groove including a substantially V-shaped cross-section, a front annular wall and a rear annular wall,
seating a gasket within the annular groove following removal of the elastomeric sealing ring from the first plastic pipe, the gasket including toothed segments circumferentially arranged within the gasket, wherein the gasket includes a substantially triangular cross-section, an inner annular surface and an outer annular surface composed of a front annular surface and a rear annular surface and each of the toothed segments includes an inner surface, an outer surface having a rear section and a substantially flat front section and a nose portion extending between the inner surface and the front section,
seating a second plastic pipe within the bell end of the first plastic pipe thereby forming a restrained pipe joint,
arranging the inner surface of each toothed segment to extend adjacent to the inner annular surface,
arranging a tooth of each toothed segment to extend radially inwardly from the inner surface,
arranging the front section of each toothed segment to extend adjacent to essentially an entire length of the front annular wall,
arranging the nose portion of each toothed segment to extend toward a corner formed by an intersection of the front annular wall and the inner annular wall,
partially withdrawing the second plastic pipe from the bell end thereby causing the toothed segments to impinge upon or dig into the first plastic pipe and the toothed segments to move towards the front annular wall,
bearing the front section of each toothed segment against the front annular wall, and thereafter,
sliding the toothed segments distally, and
preventing withdrawal of the second plastic pipe from the bell end by wedging the toothed segments between the bell end and the second plastic pipe, and
exerting radial forces outwardly from the front sections of each of the toothed segments nose portion directly to a first length of the annular front wall having a first average wall thickness and halting sliding of the toothed segments distally when the radial forces exerted from the front sections of each of the toothed segments are exerted upon a second length of the annular front wall having a second average wall thickness that is greater than the first average wall thickness.

9. The method of claim 8 wherein, when the elastomeric sealing ring is a Rieber gasket, transporting the first plastic pipe from a site where the belling occurred and thereafter removing the Rieber gasket from the first plastic pipe at a worksite where the restrained pipe joint is formed.

10. The method of claim 9 comprising seating the gasket within the annular groove at the worksite.

11. The method of claim 8 wherein each of the toothed segments includes a first angle formed by an intersection of a plane defined by the inner surface of the toothed segment and a plane defined by the front section of the outer surface of the toothed segment that is substantially equal to a second angle formed by an intersection of plane defined by an outer surface of the spigot and a plane defined by an inner surface of the front annular wall.

12. A plastic pipe joint manufactured according to the method of claim 8.

* * * * *